Dec. 27, 1949 D. GABOR 2,492,738
METHOD OF OBTAINING ENLARGED IMAGES
Filed Dec. 17, 1948
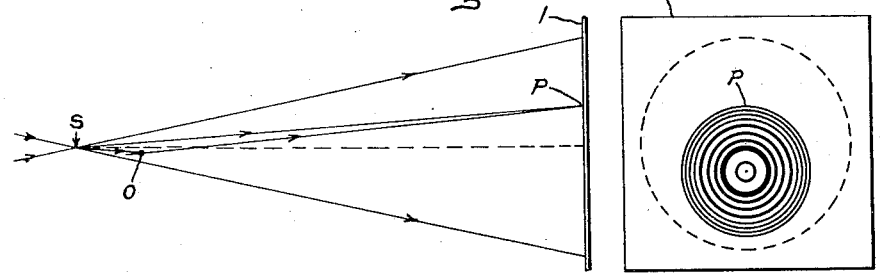
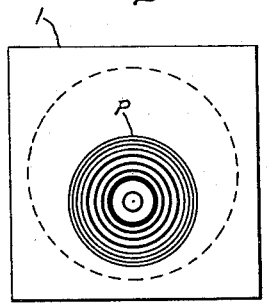
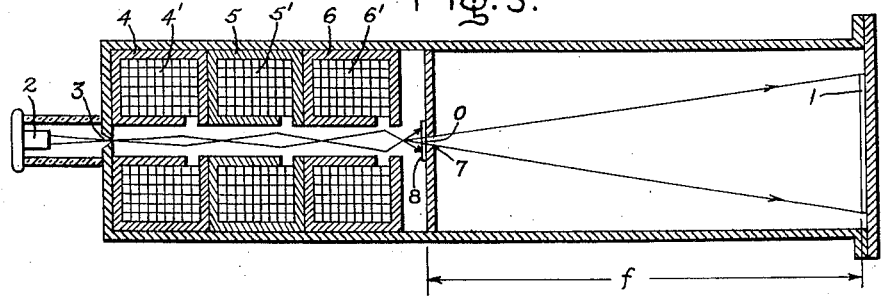
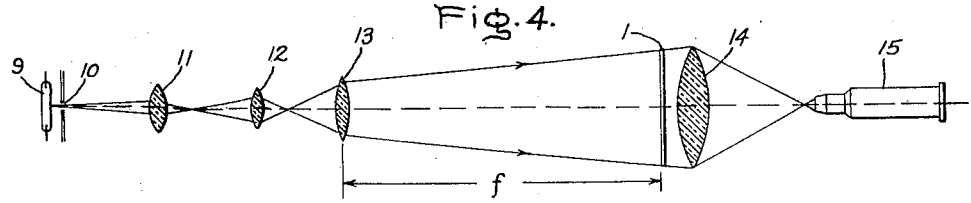
Inventor:
Dennis Gabor,
by Richard E. Hosley
His Attorney.

Patented Dec. 27, 1949

2,492,738

UNITED STATES PATENT OFFICE 2,492,738

METHOD OF OBTAINING ENLARGED IMAGES

Dennis Gabor, Rugby, England, assignor to General Electric Company, a corporation of New York Application December 17, 1948, Serial No. 65,797
In Great Britain December 17, 1947

9 Claims. (Cl. 250—49.5)

This invention relates to improvements in microscopy, optical or electronic, and is especially applicable to methods for making visible fine details of an object.

In employing the method according to the invention a particular type of diffraction pattern or diagram of the object under scrutiny is obtained with radiation of short wavelength and from a photograph or direct reproduction of the diagram a likeness of the object is obtained with radiation of longer wavelength. A preferred form of the invention comprises the utilization of electrons to procure the diffraction pattern and visible light to procure the likeness or image of the object.

A principal advantage realized by this invention resides in the fact that it is unnecessary to employ the conventional imaging electron lens of the electron microscope for obtaining the diffraction pattern. It is well-known that the resolving power of electron microscopes cannot be improved beyond a certain limit, because of the uncorrected spherical aberration of electron objectives. On the other hand the resolving power of electron microscopes without objective lenses, known as "shadow microscopes," is even lower, because the diffraction phenomena arising at small objects with fine details produce photographs very unlike the original. In the present invention these diffraction phenomena are utilized for recording, in the first step, all the relevant information on the object in a diagram not suitable for immediate recognition of said details, and this diagram is translated into a likeness of the original by a second device, using visible or ultraviolet light. The invention is based on the principle that a suitable source of illumination associated with a photographic diagram allows not only the reconstruction of the object, but also an approximate reconstruction of the whole complex of wavefronts issuing from said object when illuminated by said source.

According to Huygens' principle, if an object is illuminated by a source, the full information on said object is carried away with every wavefront, and is potentially contained in any plane or other surface traversed by said wavefront, but the information is contained in a form not suitable for immediate interpretation as it is partly in the form of amplitudes, and partly in the form of phases. Ordinary optical imaging produces phase equality in a certain plane, the image plane, but this method fails if sufficiently perfect lenses are not available. On the other hand diffraction diagrams, as ordinarily realized by means of electrons or X-rays, give no information on phases, hence reconstruction of the object, if at all possible, can be carried out only by guessing the phases, partly from the known symmetry properties of the object, partly by trial-and-error methods. In the case of more or less irregular objects, which are the most important in microscopy, these methods are entirely unsuitable. In the present invention the phases are recorded by their coincidence with the phases in a standard wavefront, issuing from a suitable source of illumination.

While in conventional diffraction cameras the diffraction diagrams result from the interference of elementary wavelets, diffracted by the object, with one another, in the camera according to the invention they result by the interference with one another and with the primary, undiffracted wave. In a preferred form of the invention the primary beam is approximately stigmatic, that is to say the illuminating wave appears to issue from a small crosssection, which for the moment may be considered as a point source, to simplify the explanations. The cone of radiation issuing from said point source should have a divergence angle at least as large as the aperture angle of a microscope with the desired resolving power, by Abbe's relation. Thus, while in conventional electron microscopes and diffraction cameras a well-collimated almost parallel illuminating beam is used, the diffraction camera according to the invention utilizes a nearly stigmatic beam, with appreciable divergence. This electron beam may be produced, as is well known and understood, by a succession of several electron lenses, which step-by-step reduce the Gaussian image either of the cross-over in the electron gun, or of a material aperture to a diameter equal to or smaller than the resolving limit of the apparatus. This fine focus is formed a small distance behind the object, though it can be formed also a small distance before it, and a photographic plate is arranged at a relatively large distance from both.

In the first case the arrangement is similar to the instruments known as "shadow microscopes," but it is known that shadow microscopes can produce, at best, a resolving power appreciably inferior to those of electron microscopes with lenses, because of diffraction phenomena. The present invention on the other hand aims at a greatly increased resolving power, by exploiting exactly that part of the information which is contained in the diffraction fringes, and which in the case of shadow microscopes has merely a disturbing effect. Accordingly, in the arrangement according to the invention, the irradiated object should not fill more than a small fraction of the illuminated area in the object plane, and similarly, the geometrical shadow of the object should fill only a small fraction of the photographic plate.

The photograph is either developed by reversal methods, or printed after ordinary development, so that a direct reproduction is obtained in which the transparency is a maximum wherever the primary wave and the wave diffracted at the object have coincided in phase, whereas in those areas where the phases were discordant the transparency is reduced to a low value. The reversed photograph, or print, is now transferred into the light optical apparatus, which is an optical imitation of the electron-optical conditions in the diffraction camera. A light-optical reproduction of the electron-optical small cross-section or approximate point source is produced, but on a scale enlarged in the proportion of the monochromatic wavelength used in the second apparatus to the de Broglie wavelength of the electrons used in the first. The optical system is so designed that said "point source" in association with a similarly enlarged model of an object would produce at the photographic plate exactly the system of fringes as are recorded on its photograph, but the photographic plate is transparent only where the direct and the diffracted rays had coincident phases, and the transparency is at least approximately proportional to the diffracted amplitudes. Hence if the photographic plate is inserted into this system, the wave front penetrating from the source through said plate will be a partial reproduction of the wave front as if an enlarged reproduction of the object were in its correct position relative to the source. Thus, viewing the source through the plate, one sees not only the source, but also the object, enlarged in the same ratio. This reconstructed virtual object may be observed or photographed by suitable viewing devices, as shown in the art.

The features which I desire to protect herein are pointed out with particularity in the appended claims. The invention itself, together with further objects and advantages thereof, may best be understood by reference to the accompanying drawing in which Figs. 1 and 2 are illustrations of interference effects usefully employed in the invention; Fig. 3 is a diagrammatic illustration of apparatus capable of producing the interference effects; and Fig. 4 is a diagrammatic illustration of a preferred optical arrangement for obtaining the enlarged image from the diffraction diagram.

In Figs. 1 and 2 the source S is for simplicity assumed as a point-focus and the object O as a point. Interference maxima on the sensitized photographic plate 1 will be produced wherever the path difference between the direct ray SP and the indirect ray SO+OP is equal to a multiple of the wavelength $\lambda$. This produces a great number of interference fringes which are approximately circles, with radii proportional to the square root of their order. It is convenient to make the number of fringes which can be accommodated on the photographic plate as large as possible, and the useful limit is reached if the distance between S and the plane of the object is made so large that the fringes at the edge can just be resolved by the photographic plate. It is also desirable to make the electron beam sufficiently monochromatic to allow interferences to this high order. As an example, with 60 kv. electrons the de Broglie wavelength is $\lambda = 0.05$ A. $= 5.10^{-10}$ cm. and with $\alpha = 0.05$ the resolving power is about 0.5 A. If the photographic plate is placed at 100 cms., the detail corresponding to said resolving power will be recorded on a diameter of 10 cms. The distance between the point focus and the object plane is made conveniently $10^5$ A. $= 10^{-3}$ cm. The illuminated area in the object plane has a diameter of $10^4$ A. $= 10^{-4}$ cms. The object is conveniently not much larger than 1000 A., and its shadow image on the photographic plate will have a diameter of 1 cm. or not much larger. The interference fringes at the edge of the plate will have a spacing of about $10^{-3}$ cm., and this can be resolved by plates having a resolving limit of 200 lines/mm. The order of the fringes at the edge is about 2500, and to achieve this the accelerating voltage of the electrons should be kept constant to within about 1 part in 10,000, which is of the same order as in conventional electron microscopes.

For the purpose of explanation it may be assumed for the moment that the photograph had been taken with light instead of with electrons. If the exposed plate is reversed, or replaced by a negative print, constituting a direct reproduction of the pattern, transmission will be best in the previously black fringes, where the phases of the direct and refracted rays were in agreement. Thus, placing this plate in the position which it occupied during the taking of the photograph, and after removing the object O, an observer looking through the plate towards the source will still see not only the source S, but also the absent object O. The reason is that the part of the wavefront of S which is appreciably transmitted by the plate is just that in which the phases coincide with wavefront modified by the object, and the transmission here can be made, by suitable photographic treatment, at least approximately proportional to the amplitudes of the modified wavefront. Thus, what the observer sees is, in effect, a part of the modified wavefront, sampled by a close system of annular apertures, but not otherwise restricted. The result is that the object O will be seen, with a definition which is not significantly worse than the fundamental limitation set by the aperture angle $\alpha$.

This effect forms the basis of the apparatus according to the invention, which may now be explained in more detail. Fig. 3 is a schematic drawing of an electron diffraction camera, which is similar in construction to an electron shadow microscope. An electron gun 2, energized by a suitable source of power (not shown), irradiates a fine aperture 3. A succession of magnetic condenser lenses 4, 5, and 6, having respectively energizing coils 4', 5' and 6' which may be excited by a suitable direct current source (not shown), reduces the Gaussian image of the aperture 3 to a diameter equal to or smaller than the resolving limit $\lambda/2 \sin \alpha$. This is desirable to ensure a sufficient degree of coherence in the electron beam which is used for the diffraction. The physical image of 3 will be in fact larger, by the unavoidable spherical aberration, and by the diffraction caused by the condenser lenses and their apertures but though these phenomena have some influence on the diffraction image of a given object, they do not seriously influence the resolving power.

The final focus or "point source" S is formed very close to the object O, which is preferably supported by a very fine membrane 8, itself supported by a diaphragm 7, or a gauze, as known in the art. The distance of S from the object can be controlled by the size of the shadow image of a known object, such as the aperture 7 itself, on a fluorescent screen which, before the exposure, replaces the photographic plate 1. The centering of the object can be carried out by the same means as in ordinary electron microscopes.

When the photograph has been taken and has been reversed or printed, it is transferred into the optical apparatus schematically shown in Fig. 4, which is essentially an optical equivalent of the electron diffraction camera, completed by a viewing device. A suitable light source 9 energized in conventional fashion by a source of power (not shown) produces light which is preferably monochromatic or monochromatised e. g., by filters, and which illuminates an aperture 10. The image of this is optically reduced by condenser lenses 11, 12, to a Gaussian diameter which bears the same ratio to the corresponding diameter in the diffraction camera as the wavelength of the light employed bears to that of the electrons. This ratio is of the order of 100,000, thus if the electronic Gaussian diameter was, say 1 A., the optical diameter is $10^5$ A.$=10^{-3}$ cm. If accurate results are required not only the Gaussian diameter must be reproduced, but also the spherical aberration and diffraction figure round it, by suitable design of the condenser lenses 11, 12.

The source is followed by a lens 13, which has the same focal length $f$ as the distance of the source and object from the photographic plate in the diffraction camera. The purpose of this is to place the plate, as seen from the source, optically at infinity. This is to say that the wavefront at the plate will have the same phase and amplitude relations as on a plate at very large distance in the absence of the lens 13, a model of the object, with all its dimensions, including its distance from the source enlarged in proportion of the wavelengths, that is to say about 100,000 times, this combination would produce on a photographic plate, placed into the position of 1, exactly the same diagram as was recorded in the electron diffraction camera. Thus the lens 13 enables one to make the transformations from electrons to light without having to enlarge all geometrical dimensions in the huge ratio of about 100,000. Looking through the photograph at the source, the observer will see an image of the object, about 100,000 times enlarged, by the same effect as described in connection with Figs. 1 and 2.

The viewing device comprises a large lens 14, carefully corrected for spherical aberration, which produces an image of the virtual object. This may be viewed or photographed through a microscope or other enlarging device 15, but it can be also photographed without further enlargement, as the magnification produced by the transition from electrons to light is of the order 100,000 and this is sufficient to record all relevant details on photographic plates with sufficiently fine grain.

A striking property of the imaging method according to the invention is that every diffraction diagram records the object not only in one plane, but also in depth, thus in the case of objects with appreciable longitudinal extension they can be explored in depth in the viewing device, in just the same way as a deep object is explored under a microscope.

Though the principle of the invention has been illustrated only by its application to electron microscopy, it is evident that it can be applied also to ultra-violet microscopy, wherever sufficiently strong monochromatic light sources are available. Other modifications and applications of the principle will be obvious to those skilled in the art. I therefore aim in the appended claims to cover this and all such equivalent variations of application and adaptations as are within the true spirit and scope of the foregoing disclosure.

What I claim as new and desire to secure by Letters Patent of the United States is:

1. The method of obtaining an enlarged image of an object which comprises irradiating the object with an essentially stigmatic electron beam to form a diffraction pattern upon a sensitized plate, printing said plate to obtain a direct reproduction of said pattern, and illuminating said plate with a beam of light to form an enlarged virtual image of said object.

2. The method of obtaining an enlarged image of an object which comprises irradiating the object with an essentially sigmatic electron beam to form a diffraction pattern upon a sensitized plate, printing said plate to obtain a direct reproduction of said pattern, and illuminating said plate with a beam of light emanating from a source placed optically at infinity with respect to said plate to form an enlarged virtual image of said object.

3. The method of obtaining an enlarged image of an object which comprises irradiating the object with an essentially stigmatic electron beam to form a diffraction pattern upon a sensitized plate, printing said plate to obtain a direct reproduction of said pattern, and illuminating said plate with a beam of light emanating from a source placed optically at infinity with respect to said plate whereby an enlarged virtual image of said object may be viewed from the side of said plate opposite said light source.

4. The method of obtaining an enlarged image of an object which comprises irradiating the object with an essentially stigmatic monochromatic electron beam to form a diffraction pattern upon a sensitized plate, said object filling only a small fraction of the area irradiated by said electron beam in the plane of said object, printing said plate to obtain a direct reproduction of said pattern, and illuminating said plate with an essentially monochromatic beam of light emanating from a source placed optically at infinity with respect to said plate to form an enlarged virtual image of said object.

5. The method of obtaining an enlarged image of an object which comprises irradiating the object with an essentially stigmatic monochromatic electron beam to form a diffraction pattern upon a sensitized plate, said electron beam emanating from an aperture reduced to a fine focus adjacent the object, printing said plate to obtain a direct reproduction of said pattern; and illuminating said plate with an essentially monochromatic beam of light emanating from an aperture reduced to a fine focus on a scale enlarged with respect to said first mentioned fine focus in the proportion of the wavelength of said light to the wavelength of said electrons whereby an enlarged virtual image of said object may be formed.

6. The method of obtaining an enlarged image of an object which comprises irradiating the object with an essentially stigmatic monochromatic electron beam to form a diffraction pattern upon a sensitized plate, said electron beam emanating from an aperture reduced to a fine focus adjacent the object and having an area in the plane of said object which is large in comparison to the cross-section of said object, printing said plate to obtain a direct reproduction of said pattern, and illuminating said plate with an essentially monocromatic beam of light emanating from an aperture reduced to a fine focus on a scale enlarged with respect to the fine focus of said electron beam in the proportion of the wavelength of said visible light to the wavelength of said electrons whereby an enlarged virtual image of said object may be formed.

7. The method of obtaining an enlarged image of an object which comprises irradiating an aperture with an essentially monochromatic beam of electrons, reducing the image of said aperture to a diameter approximately equal to the resolving limit $\lambda/2 \sin \alpha$ where $\lambda$ is the wavelength of said electrons and $\alpha$ is the aperture angle, placing an object near said reduced image of said aperture whereby said beam may be diffracted to form a diffraction pattern, exposing a sensitized plate with said diffracted beam to obtain a photograph of said pattern, printing said plate, and illuminating said plate with an essentially monochromatic beam of light emanating from an aperture having an image reduced to a diameter bearing the same ratio with the diameter of said first mentioned reduced aperture image as the wavelength of said light bears to the wavelength of said electrons whereby an enlarged virtual image of said object may be formed.

8. The method of obtaining an enlarged image of an object which comprises irradiating an aperture with an essentially monochromatic beam of electrons, reducing the image of said aperture to a diameter approximately equal to the resolving limit $\lambda/2 \sin \alpha$ where $\lambda$ is the wavelength of said electrons and $\alpha$ is the aperture angle, placing an object near said reduced image of said aperture whereby said beam may be diffracted to form a diffraction pattern, exposing a sensitized plate with said diffraction beam to obtain a photograph of said pattern, printing said plate, and illuminating said printed plate with an essentially monochromatic beam of light emanating from an aperture placed optically at infinity with respect to said plate and having an image reduced to a diameter bearing the same ratio with the diameter of said first mentioned reduced aperture image as the wavelength of said light bears to the wavelength of said electrons whereby an enlarged virtual image of said object may be formed.

9. The method of obtaining an enlarged image of an object which comprises irradiating an aperture with an essentially monochromatic beam of electrons; reducing the image of said aperture to a diameter approximately equal to the resolving limit $\lambda/2 \sin \alpha$ where $\lambda$ is the wavelength of said electrons and $\alpha$ is the aperture angle; placing an object near said reduced image of said aperture whereby said beam may be diffracted to form a diffraction pattern; exposing a sensitized plate located in the path of said diffracted beam to obtain a photograph of said pattern; printing said plate; and illuminating said printed plate with an essentially monochromatic beam of light to form an enlarged virtual image of said object, said beam being produced from a light irradiated aperture the image of which is optically reduced to a diameter bearing the same ratio with the diameter of said first mentioned reduced aperture image as the wavelength of said light bears to the wavelength of said electrons, and said printed plate being placed optically at infinity with respect to said reduced image by an optical lens having a focal length equal to the distance between said plate and said first mentioned reduced aperture image during said exposure.

DENNIS GABOR.

No references cited.

Certificate of Correction

Patent No. 2,492,738                   December 27, 1949

DENNIS GABOR

It is hereby certified that error appears in the printed specification of the above numbered patent requiring correction as follows:

Column 6, line 25, for "sigmatic" read *stigmatic*;

and that the said Letters Patent should be read with this correction therein that the same may conform to the record of the case in the Patent Office.

Signed and sealed this 23rd day of May, A. D. 1950.

[SEAL]

THOMAS F. MURPHY,
*Assistant Commissioner of Patents.*